United States Patent [19]

Roberts et al.

[11] 4,205,861

[45] Jun. 3, 1980

[54] AUTOMOTIVE VEHICLE WHEEL SPRAY COLLECTOR

[75] Inventors: Frederick D. Roberts, Sequim, Wash.; Myrle A. Roberts, heiress, Rte. 4, Box 978, Sequim, Wash. 98382

[73] Assignees: Philip A. Stewart; Roy J. Moyer; James T. Nicholson; J. Thomas Schneider, all of Seattle, Wash. ; part interest to each

[21] Appl. No.: 882,765

[22] Filed: Mar. 2, 1978

[51] Int. Cl.² .............................................. B62B 9/16
[52] U.S. Cl. ............................................ 280/154.5 R
[58] Field of Search ................. 280/154.5 R; 239/558, 239/566, 568

[56] References Cited

U.S. PATENT DOCUMENTS

| 3,337,238 | 8/1967 | Weasel | 280/154.5 R |
| 3,341,222 | 9/1967 | Roberts | 280/154.5 R |
| 3,834,732 | 9/1974 | Schons | 280/154.5 R |
| 3,874,697 | 4/1975 | Thompson | 280/154.5 R |
| 3,899,192 | 8/1975 | Reddamay | 280/154.5 R |

*Primary Examiner*—Robert R. Song
*Attorney, Agent, or Firm*—Robert W. Beach; Ward Brown

[57] ABSTRACT

Sectional spray collector arched shields are mounted above a vehicle wheel and extend around approximately one-eighth to one-half of the vehicle wheel circumference. Each shield includes adjacent, downwardly flaring collector channels running circumferentially of shield. The collector channels have apertures in their crests and the aperture marginal portions are formed by flanges to divert the spray into troughs between adjacent collector channels. Water from the troughs is collected in runoff gutters inclined inboard to dump the drainage water beneath the vehicle.

16 Claims, 12 Drawing Figures

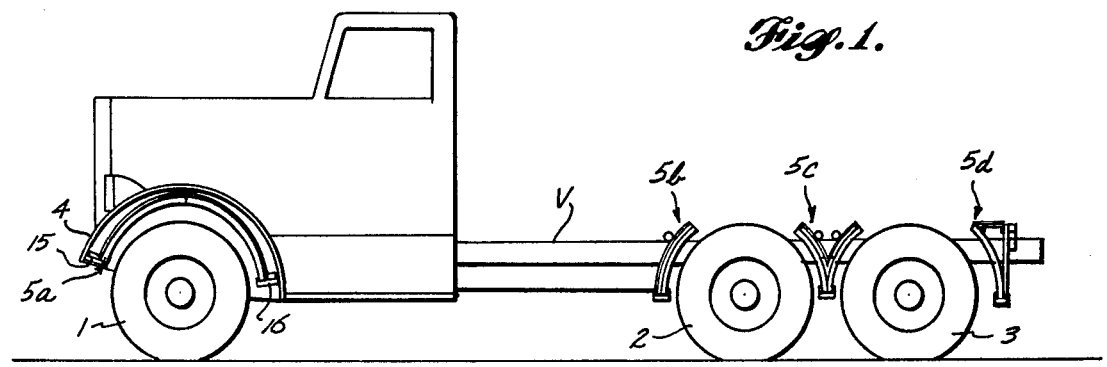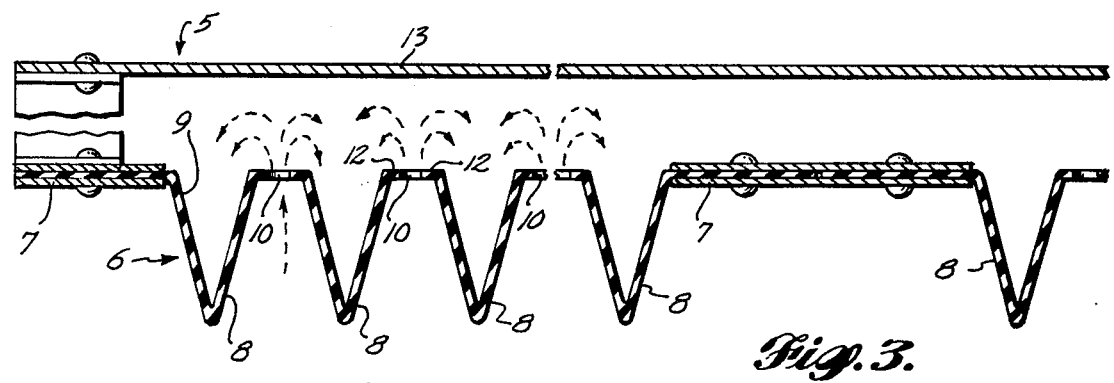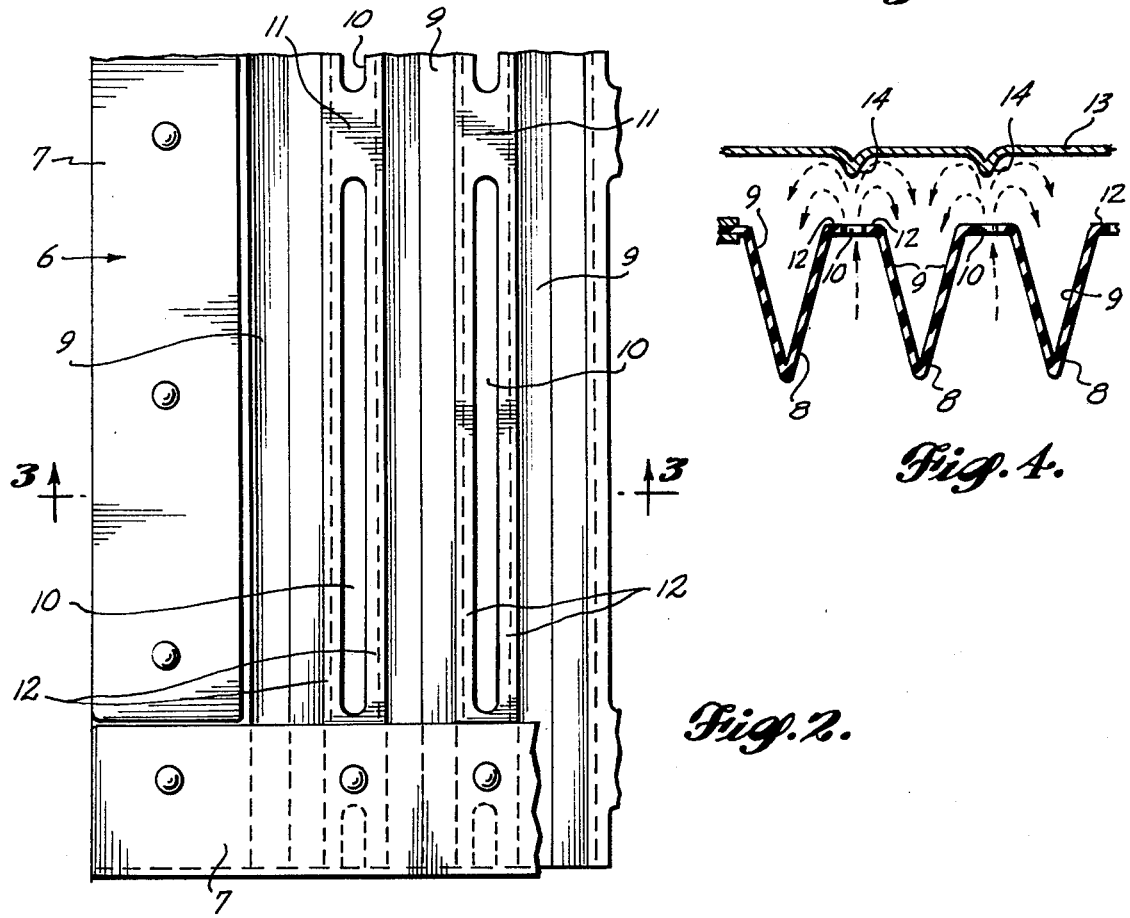

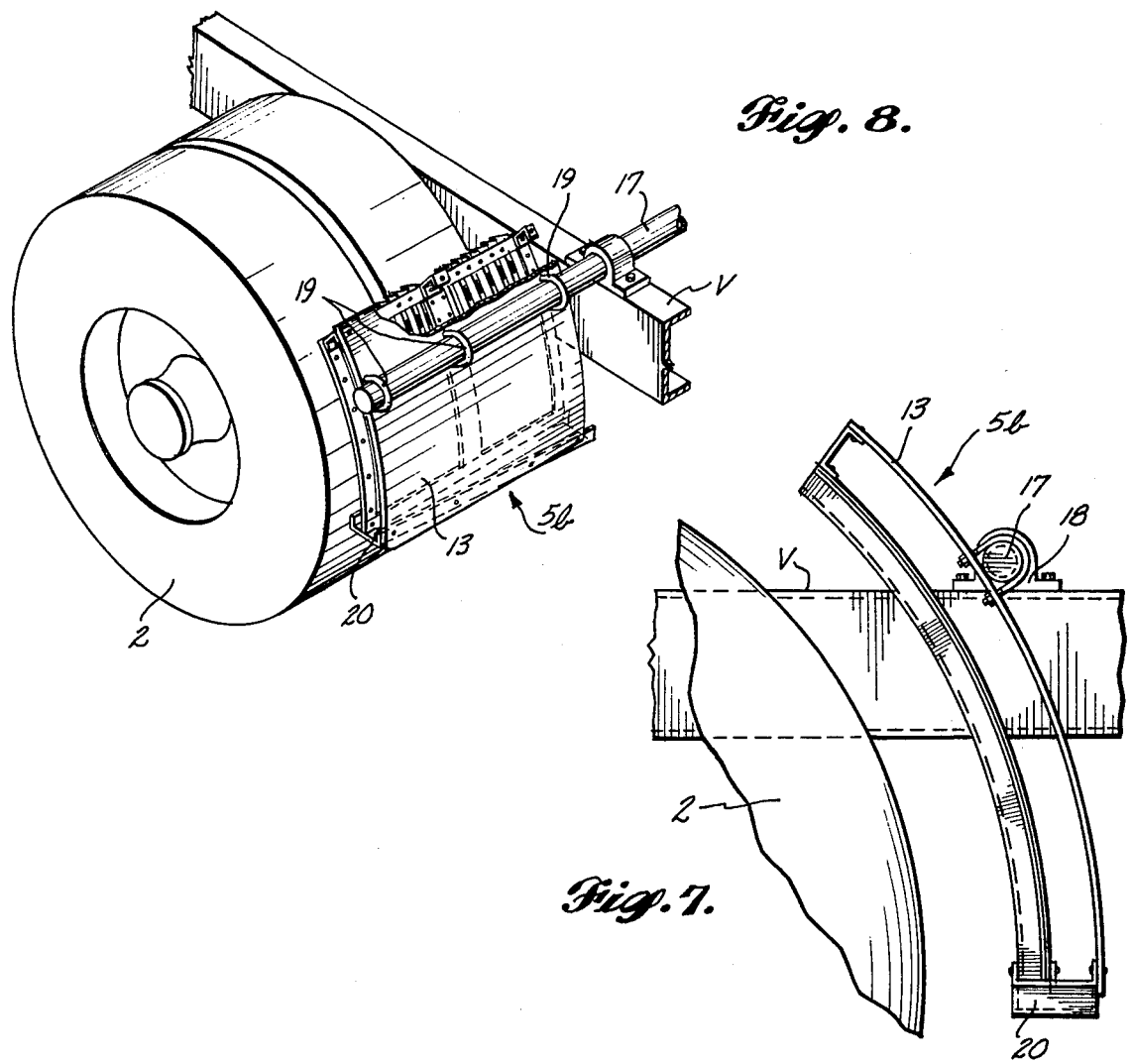
Fig. 8.
Fig. 7.
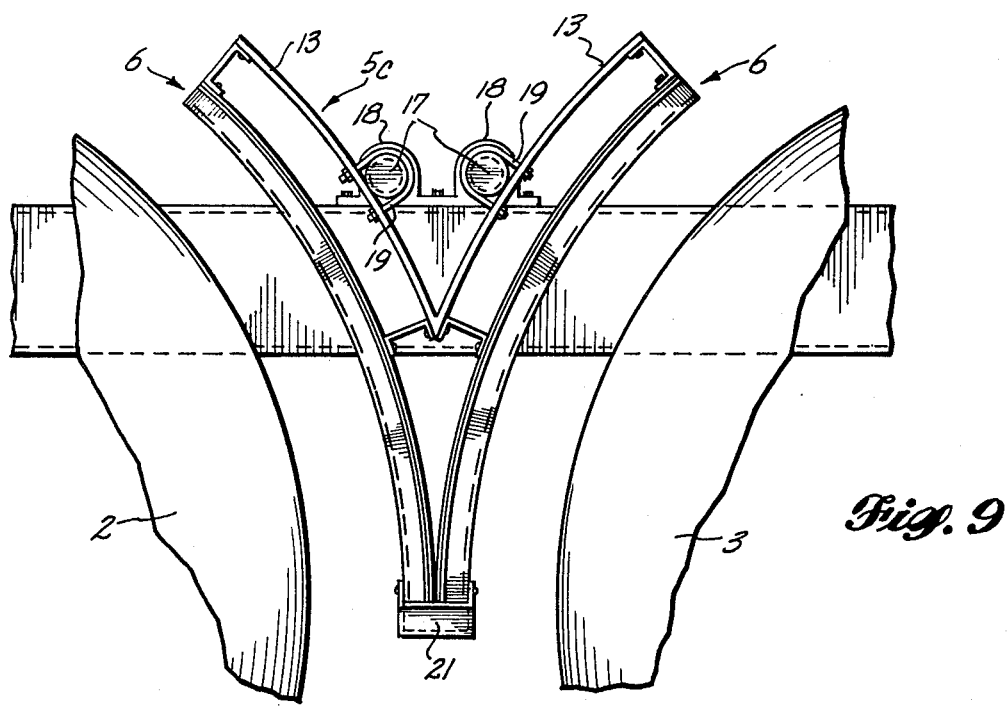
Fig. 9

AUTOMOTIVE VEHICLE WHEEL SPRAY COLLECTOR

BACKGROUND OF THE INVENTION

1. Field of the Invention

The present invention relates to spray collectors for collecting spray flung from vehicle wheels, and for consolidating collected spray into streams of water diverted from contact with the vehicle wheels.

2. Prior Art

The present invention constitutes an improvement of the vehicle wheel spray collector disclosed in Roberts U.S. Pat. No. 3,341,222.

Other types of structure have been proposed to reduce spray flung from vehicle wheels, but the structure disclosed in the aforesaid patent is most similar to the subject matter of the present invention.

SUMMARY OF THE INVENTION

It is the principal object of the present invention to increase the efficiency of a spray collector of the general type disclosed in U.S. Pat. No 3,341,222 so as to collect even more of the spray flung from vehicle wheels.

A more specific object is to trap a greater proportion of spray flung from a vehicle wheel against a spray collector, instead of a portion of the spray being deposited on the wheel to be flung from it again.

Another object is to consolidate trapped spray more effectively and to dump the resulting runoff inboard of the vehicle so that such runoff is not picked up by following wheels or suspended by air currents.

The foregoing objects can be accomplished by dispersing spray passing through collector apertures by diverting and/or deflecting the spray from the collector apertures so that the spray flung by the wheel can pass upward more readily through the apertures of the shield.

BRIEF DESCRIPTION OF THE DRAWINGS

FIG. 1 is a side elevation of a representative vehicle to which a collector shield in accordance with the present invention has been applied.

FIG. 2 is an elevation of a fragment of the collector shield of FIG. 1 on an enlarged scale, and FIG. 3 is a transverse section through such fragment taken on line 3—3 of FIG. 2.

FIG. 4 is a transverse section through a portion of a shield in accordance with the present invention showing a modification of the structure.

FIG. 7 is a side elevation of a spray collector shield installation at the front of a rear vehicle wheel, and FIG. 8 is a top perspective of such installation.

FIG. 9 is a side elevation of a spray collector shield installation located between tandem rear wheels of a vehicle.

DETAILED DESCRIPTION

Figure 5:
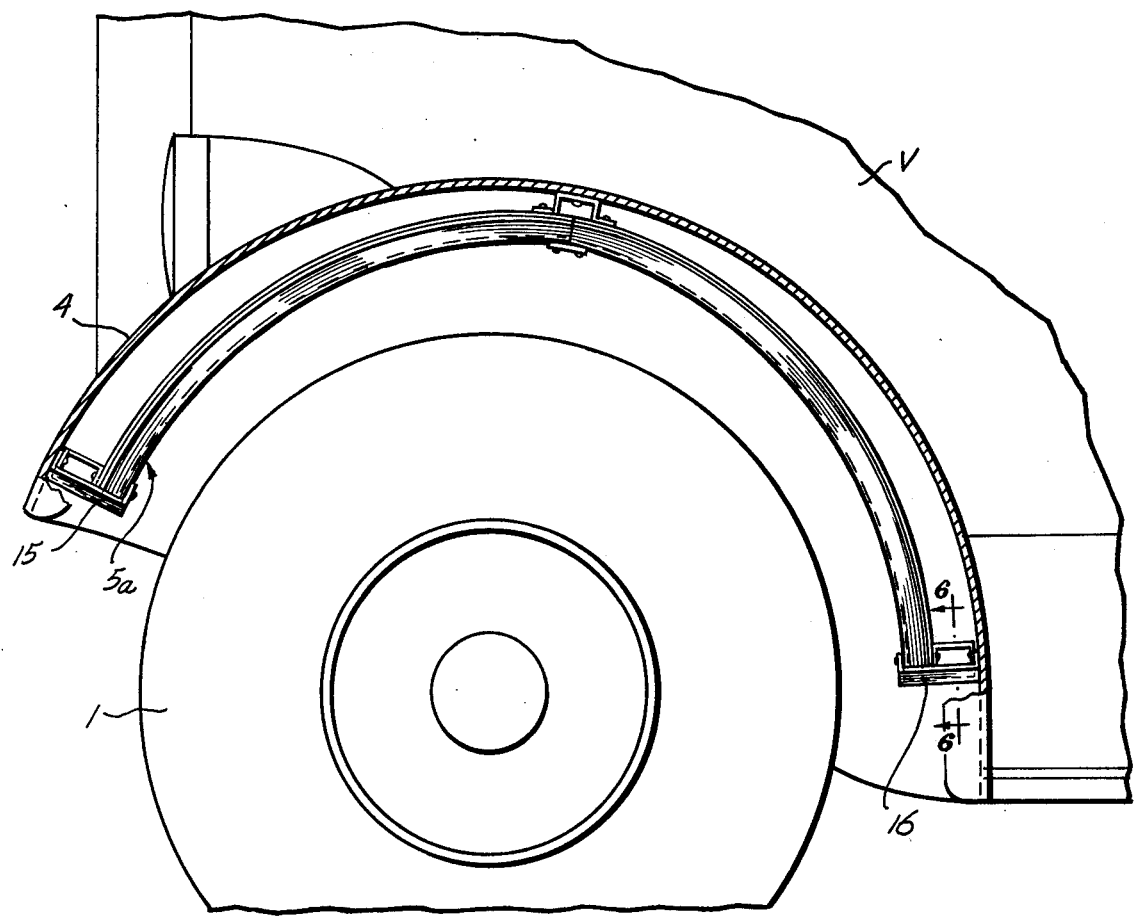
FIG. 5 is a side elevation of a spray collector shield installation for a front vehicle wheel.

The vehicle wheel spray collector shield of the present invention operates on the same general principle as the spray collector disclosed in Roberts U.S. Pat. No. 3,341,222, but the shield of the present invention is more effective and has certain advantages over the spray collector of that patent.

Both the spray collector shield of U.S. Pat. No. 3,341,222 and the shield of the present invention are applicable to various types of vehicles, but the present invention is particularly applicable to a tandem rear wheel truck or tractor, such as vehicle V shown in FIG. 1. Spray collector shields can be installed for the front wheel 1, the forward wheel or wheels 2 of tandem rear wheels and the rear wheel or wheels 3 of tandem rear wheels. To be most effective a spray collector shield installation should be made for each of the vehicle wheels, although a single installation can be made for each pair of dual wheels.

It is preferred that the spray collector shield installation for the front vehicle wheel 1 be made beneath the conventional fender 4. The detail structures of the shield 5a for the front wheel, of the shield 5b ahead of the front wheel of the tandem rear wheels, of the shield 5c located between the front wheel and the rear wheel of the tandem rear wheels and of the shield 5d behind the rear wheel 3 are generally the same. In each instance, the shield 5 includes the structure shown in detail in FIGS. 2 and 3.

The principal component of each shield 5 is a lower arch 6 having a corrugated central portion and marginal flanges 7 along its arcuate sides by which the arch is mounted. The curvature of the arch generally conforms to the curvature of the vehicle wheel and the arch is substantially concentric with the wheel. The concave side of the arch has a series of side-by-side downwardly opening channels 8 which flare downward from their crests. The convex side of the arch has upwardly flaring collection troughs 9 located between the downwardly flaring channels 8. Such arch structure is generally similar to the structure of the spray collector arch disclosed in U.S. Pat. No. 3,341,222.

In the arch structure of U.S. Pat. No. 3,341,222, the downwardly opening channels of the arch have arcuate slots in their crests through which spray flung by the wheel periphery can pass. If as much as possible of such spray is to be trapped by the shield structure, it is important that the spray be able to pass readily through the discharge apertures and not return through such apertures for further contact with the wheel. Free passage of spray through apertures in the channel crest can be facilitated by deflecting or diverting spray which has passed through such apertures from the location immediately above the apertures as quickly as possible and to as great an extent as possible. A principal feature of the present invention is to free the discharge apertures of obstruction by spray that has passed through them.

The corrugated arch 6 of the spray collector shield of the present invention has apertures 10 in the crests of the downwardly opening channels 8 through which spray can pass. Such apertures are in the form of elongated slots having their lengths extending circumferentially of the arch and spaced apart circumferentially by web portions 11. The most important feature of the present invention is to form at least a portion of the convex margin of each slot 10 as a flange 12 extending transversely of the flow of spray through the slots, and the angle between such margin and the adjacent slot side being substantially a right angle to form a square corner, as shown in FIGS. 3 and 4.

In FIGS. 2 and 3, the flanges 12 are shown as forming the opposite margins of the slots 10 and as being aligned at opposite sides of the slots. The flaring angle of each collector channel preferably is about 30 degrees but such angle could be within the range of approximately 15 degrees to 45 degrees. Where the angle is 30 degrees, the flange would project from the side of a downwardly opening channel 8 at an angle of 105 degrees. As best seen in FIG. 3, the edge of each flange forming a side of a discharge slot is generally perpendicular to the width of the slot. In addition, the face of each flange remote from the concave side of the arch is generally parallel to the width of the slot.

Where the opposite margins of a discharge slot 10 are formed by flanges 12 as shown in FIGS. 2 and 3, the spray will generally tend to divide along the central plane of the slot. The square corner between the convex side of such flange and the adjacent side of the discharge slot diverts spray flowing past such corner around behind the flange to remove such spray from registration with the slot and move it toward an adjacent spray collection trough 9. Preferably, the slot is less than one-quarter inch wide so that most of the spray passing through the slot is deflected to opposite sides of the slot. In addition, the flanges forming the edge of the slot should be narrow, preferably less than one-eighth inch wide, so that spray is not relfected by a flange back to a wheel. It is believed that a flange width of one-sixteenth inch and a slot width of three-sixteenths inch are optimum.

A backing 13 is located quite close to the convex side of the corrugated arch 6 so that spray deflected by passing across the flanges 12 may strike the backing 13 at an angle for reflection down into a collection trough 9. If it were not for the flanges 12, spray passing through a discharge slot 10 would tend to strike the backing 13 in a direction perpendicular to it and rebound directly toward the slot so as to pass through such slot back to the wheel or at least impinge against further spray passing through the slot.

The effect of the edge flanges 12 to deflect spray behind them decreases progressively away from such flanges. Consequently, the deflecting action of the flanges would be least at the central portion of each slot 10. To assist further in clearing the discharge side of the slot, it may be desirable to provide splitter ribs 14 aligned with the centers of the spray discharge slots 10 on the underside of the backing 13 as shown in FIG. 4. The closer backing 13 is to the convex side of the arch 6, the more effective the splitter ribs 14 will be in dividing the central portion of the spray and diverting such spray portion to opposite sides of the slot. In addition, it is desirable for the backing 13 to be reasonably close to the corrugated arch 6 to provide a compact shield structure.

Preferably, the depth of the downwardly opening channels 8 and of the upwardly opening collection troughs 9 should be from one inch to two inches, and the spacing between the backing 13 and the convex side of the arch 6 should be not more than twice as great as the depth of a groove of the corrugated arch. Thus, if the grooves 8 and 9 are one inch deep, the spacing between the backing 13 and a convex side of the arch should be not more than two inches. If the depth of a corrugation groove 8 and 9 is two inches, the spacing between the backing 13 and the convex side of the arch should be not more than four inches. The size and proportions of the shield will be governed by the type of vehicle and the location on such vehicle where the shield is to be installed.

Figure 6:
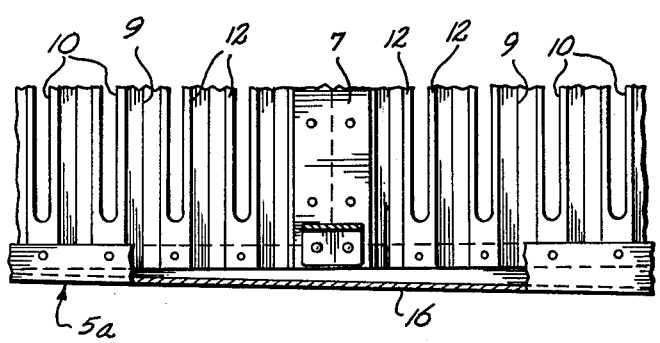
FIG. 6 is an enlarged detail section of a portion of such shield taken on line 6—6 of FIG. 5.

FIGS. 5 and 6 show a representative installation of the shield of the present invention on the front wheel of a vehicle beneath the fender 4. In this instance, the arcuate extent of the shield is about 160 degrees. The shield is continuous over the upper side of the wheel. Spray collected in the troughs 9 of the forward portion of the shield run down into a runoff gutter 15 beneath the forward end of the shield, which gutter is sloped to consolidate and dump the runoff water inboard beneath the vehicle. Water collected in the troughs 8 of the rear portion of the shield runs aft into a runoff gutter 16 beneath the rear end of the shield which gutter also slopes inboard to dump the consolidated runoff water beneath the vehicle.

By dumping water collected by a spray collector shield inboard beneath the vehicle, there is no possibility of discharging the water onto a passing vehicle. Moreover, there is less possibility that dumped water will be caught in turbulence caused by a fast moving truck, which might tend to blow the discharged water into coarse spray instead of substantially all of the water being deposited on the ground.

Providing wheel spray collector shields for the tandem rear wheels of an automotive semitrailer tractor, such as shown in FIG. 1, presents a special problem. It is desirable for the wheels of such a vehicle to be large in order to carry maximum load, yet it is desirable for the bottom of the forward portion of a semitrailer to be as low as possible to provide maximum cargo space. It is necessary, however, for the bottom of the forward portion of the semitrailer to be higher than the the tractor rear wheels so that the tractor rear wheels can pass beneath the floor of the forward portion of the semitrailer when the rig is turning if the tractor wheels are equipped with chains. Consequently, the clearance afforded between the bottom of the forward portion of the semitrailer and the tops of the tractor rear wheels is as small as practical. There is therefore not sufficient room for a spray collector shield to extend over the uppermost portion of a tractor rear wheel.

Despite the limitation as to location of a spray collector shield for the rear wheel of a tractor, an effective spray collector shield installation can be made in the manner shown in FIG. 1 by utilizing sectional shields. The shield section 5b located in front of the forward wheel of a tandem rear wheel installation is shown in greater detail in FIGS. 7 and 8. Installation of a spray collector shield section 5c located between the front and rear wheels of tandem rear wheels is shown in greater detail in FIG. 9. The spray collector shield 5d located behind the rear wheel of tandem rear wheels of an automotive vehicle tractor is shown in FIGS. 10, 11 and 12.

As shown in FIGS. 7 and 8, the spray collector shield unit 5b can be mounted in front of the front wheels of tandem wheels on the starboard side of the rear portion of a tractor by a pipe 17 secured to the frame of the vehicle by a mounting 18. The pipe is secured to the backing 13 of the shield unit by U-bolts 19 extending through the backing. A runoff gutter 20 is mounted below the lower end of the corrugated arch 6 and slopes inboard to discharge consolidated collected spray beneath the vehicle. The spaces between the corrugated arch 6 and the backing 13 at the inboard and outboard ends of the unit and at the top of the unit can be suitably capped so as to trap the spray between the corrugated arch and the backing.

The general structure of the spray collector shield unit located between the front and rear wheels of tandem wheels is shown in FIG. 9. This structure is composed of shield sections mounted back-to-back at an angle such that the arches 6 facing forward and rearward, respectively, are generally concentric with the front and rear wheels of the tandem pair. The lower ends of the upwardly divergent arches 6 can be held in adjacent relationship by being embraced by a runoff gutter 21 sloping inboard. The unit can be mounted by two pipes 17 exending transversely of the vehicle and secured to the vehicle frame by mounting members 18. The pipes 17 are secured to the backings 13 of the shields by U-bolts 19 extending around the pipes.

Figure 12:
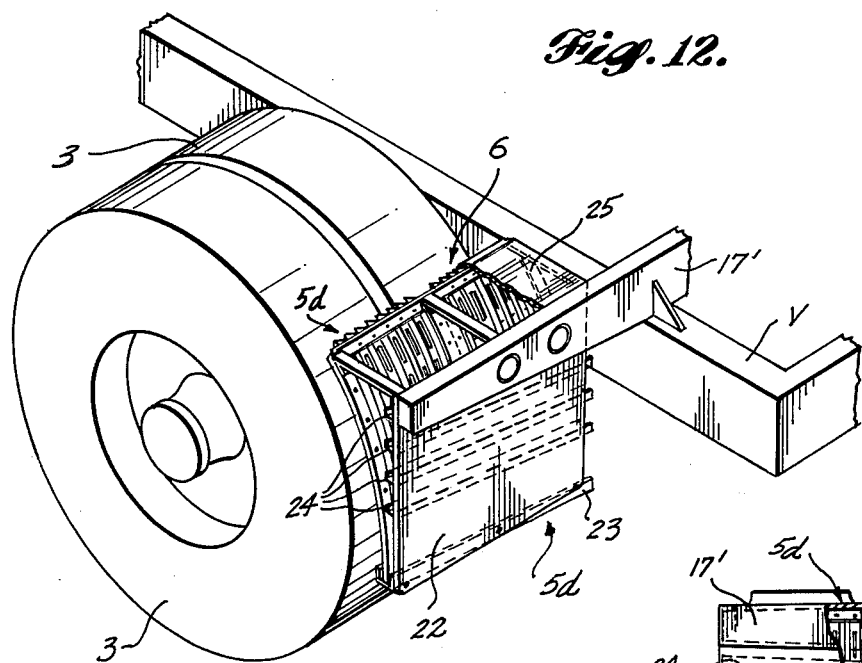
FIG. 12 is a top perspective of such an installation.
Figure 11:
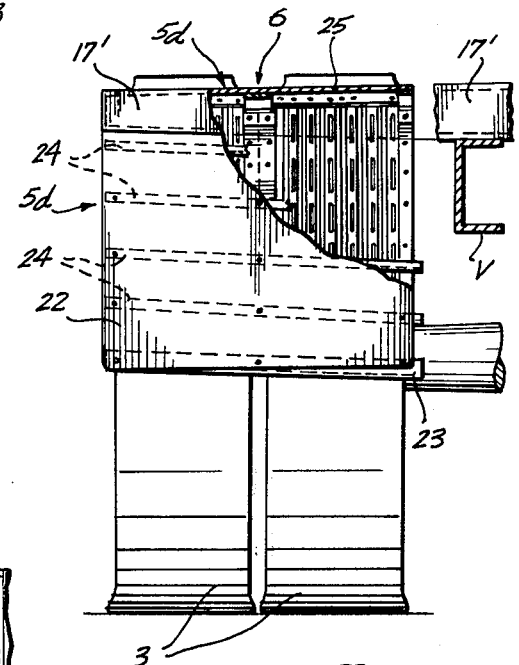
FIG. 11 is a rear elevation of such installation with parts broken away.
Figure 10:
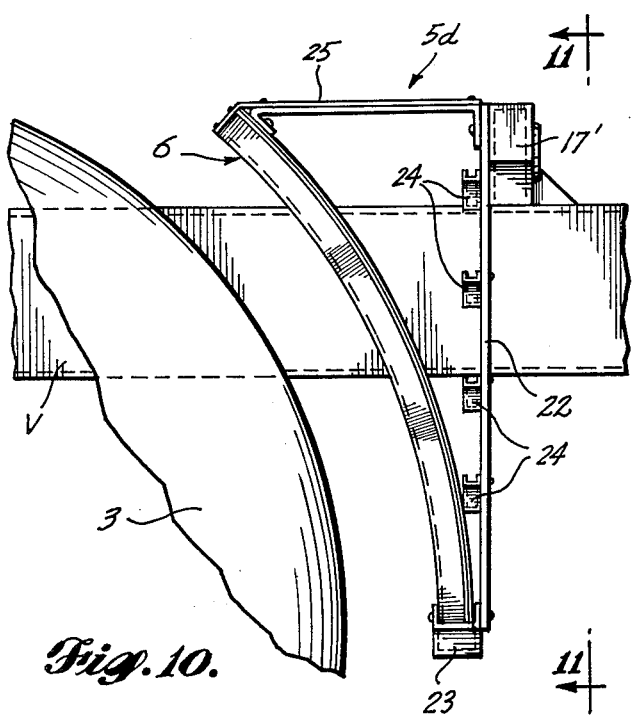
FIG. 10 is a side elevation of a spray collector shield installation at the rear of a rear vehicle wheel.

As shown in FIGS. 10, 11 and 12, the spray collector shield to be mounted behind the rear wheel of a tandem pair of rear wheels can be constructed by mounting a corrugated arch 6 on a mud flap 22. This mud flap is mounted on the tractor frame by a beam or bracket 17'. The lower end of the corrugated arch 6 is received in a runoff gutter 23 which again is sloped inboard to deposit beneath the vehicle water collected from the troughs of the shield 6 and consolidated in the gutter. If desired, additional runoff gutters 24, each sloping inboard, can be mounted on the forward side of the mud flap 22 in elevationally spaced relationship.

The space between the upper end of the corrugated arch 6 and the top of the mud flap 22 can be closed by a cover 25. Also, the space between the arch 6 and the mud flap 22 at the inboard and outboard ends of the shield can be suitably closed.

It is preferred that the corrugated arch 6 be made of substantially rigid wear-resisting plastic material such as rigid polyurethane or polyethylene.

I claim:

1. In a vehicle wheel spray collector shield including an arch having a spray-collecting channel on the concave side of such arch flaring away from the crest of such channel, such channel having a slot in its crest with the length of such slot extending generally circumferentially of the arch, and backing means overlying the convex side of such arch, the improvement comprising a spray-diverting flange extending inward from a side of the channel, the edge of said flange forming a side of the slot.

2. In the vehicle wheel spray collector shield defined in claim 1, the spray-diverting flange extending inward from a side of the channel at an angle to such channel side.

3. In the shield defined in claim 2, spray-diverting flanges extending inward from and at angles to opposite sides of the channel and forming opposite sides of the slot.

4. In the shield defined in claim 1, 2 or 3, the width of the slot being greater than the width of one of the flanges forming a side of such slot.

5. In the shield defined in claim 1, or 2, the flanges forming opposite sides of the slot being substantially aligned transversely of the slot.

6. In the shield defined in claim 1, 2 or 3, the backing being spaced from the convex side of the arch a distance no greater than twice the depth of the spray-collecting channel.

7. In the shield defined in claim 1, or 2, the arch having an arcuate extent of approximately forty-five degrees.

8. In the shield defined in claim 1, or 2, the shield including two arcuate sections mounted above a vehicle wheel and having their upper ends spaced apart to leave the uppermost portion of the wheel free of overlying shield.

9. In the shield defined in claim 2, two arch sections mounted back-to-back between adjacent tandem vehicle wheels with their lower ends in adjacent relationship and diverging upwardly from their lower ends.

10. In the shield defined in claim 2, the edge of the flange forming a side of the slot extending generally perpendicular to the width of the slot.

11. In the shield defined in claim 2, the face of the flange remote from the concave side of the arch being generally parallel to the width of the slot.

12. In a vehicle wheel spray collector shield including an arch having a spray-collecting channel on the concave side of such arch flaring away from the crest of such channel, such channel having a slot in its crest with the length of such slot extending generally circumferentially of the arch, and backing means overlying the convex side of such arch, the improvement comprising the slot having a margin formed by the portion of the convex side of the arch alongside the slot which arch portion extends generally parallel to the width of the slot.

13. In a vehicle wheel spray collector shield including an arch having a spray collecting channel on the concave side of such arch flaring away from the crest of such channel, such channel having a slot in its crest with the length of such slot extending generally circumferentially of the arch, and backing means overlying the convex side of such arch, the improvement comprising a spray-diverting flange having an edge forming a side of the slot which edge is disposed in a plane generally perpendicular to the width of the slot.

14. In the vehicle wheel spray collector shield defined in claim 13, opposed spray-diverting flanges having edges forming opposite sides of the slot, each of said edges being disposed in a plane and those planes being parallel and generally perpendicular to the width of the slot.

15. In the vehicle wheel spray collector shield defined in claim 14, the face of each flange remote from the concave side of the arch forming substantially a right angle with the edge plane of such flange.

16. In a vehicle wheel spray collector shield including an arch having a spray-collecting channel on the concave side of such arch flaring away from the crest of such channel, such channel having a slot in its crest with the length of such slot extending generally circumferentially of the arch and an edge of such slot disposed in a plane, and backing means overlying the convex side of such arch, the improvement comprising the slot having a margin formed by the convex side of the arch alongside the slot which margin is generally perpendicular to the slot edge plane.

* * * * *

UNITED STATES PATENT AND TRADEMARK OFFICE
CERTIFICATE OF CORRECTION

PATENT NO. : 4,205,861
DATED : June 3, 1980
INVENTOR(S) : Frederick D. Roberts; Myrle A. Roberts, heiress It is certified that error appears in the above-identified patent and that said Letters Patent are hereby corrected as shown below:

Title page, [56] References Cited, cancel "Reddamay" and insert --Reddaway--.

Column 5, line 63, cancel "or 2" and insert --2 or 3--.

Column 6, line 5, cancel "or 2" and insert --2 or 3--; line 8, cancel "or 2" and insert --2 or 3--.

Signed and Sealed this

Twelfth Day of August 1980

[SEAL]

Attest:

SIDNEY A. DIAMOND

Attesting Officer

Commissioner of Patents and Trademarks